US006001274A

United States Patent [19]

Farkas et al.

[11] Patent Number: 6,001,274

[45] Date of Patent: Dec. 14, 1999

[54] COMPOSITION TO DETOXIFY AND TO CONVERT FORMALDEHYDE IN GASEOUS STATE AND IN AQUEOUS AND NON-AQUEOUS SOLUTIONS

[75] Inventors: Gabriel Julius Farkas, Northridge; Michel Iskarous, Walnut, both of Calif.

[73] Assignee: Gabriel J. Farkas, Northridge, Calif.

[21] Appl. No.: 09/225,374

[22] Filed: Jan. 4, 1999

[51] Int. Cl.[6] .......................... A62D 3/100; C09K 3/100; A01N 1/00

[52] U.S. Cl. .......................................... 252/184; 252/193

[58] Field of Search .................................... 252/184, 193

[56] References Cited

U.S. PATENT DOCUMENTS

| | | | |
|---|---|---|---|
| 3,400,019 | 9/1968 | Clifford et al. | 252/184 |
| 4,397,756 | 8/1983 | Lehmann | 252/182 |
| 4,443,354 | 4/1984 | Eian | 252/190 |
| 5,160,503 | 11/1992 | Smith | 252/184 |
| 5,328,635 | 7/1994 | Chou et al. | 252/194 |
| 5,433,891 | 7/1995 | Chou et al. | 252/194 |
| 5,506,329 | 4/1996 | Chou et al. | 528/60 |
| 5,837,159 | 11/1998 | Farkas et al. | 252/184 |

*Primary Examiner*—Jerry D. Johnson

[57] ABSTRACT

A chemical composition is disclosed herein for performing a rapid neutralization of formaldehyde vapors, control of incidental releases, detoxification and disposal of spent or unused aqueous and/or non-aqueous formaldehyde solutions, and feasible conversion of the waste formaldehyde into a coarse pharmaceutical product.

The composition is consisting essentially of an alkanolamine for rapid reaction with formaldehyde vapors, with formaldehyde in aqueous and/or non-aqueous solutions and for optimizing the reactions; a coumarin metabolite for neutralizing formaldehyde in concentrated aqueous solutions; urea for forming an inclusion/addition compound with formaldehyde, and; beta cyclodextrin for inclusion complexation of the methanol and methylene glycol in inhibited formaldehyde solutions.

1 Claim, No Drawings

COMPOSITION TO DETOXIFY AND TO CONVERT FORMALDEHYDE IN GASEOUS STATE AND IN AQUEOUS AND NON-AQUEOUS SOLUTIONS

BACKGROUND OF THE INVENTION

1. Field of the Invention

The present invention relates to the field of detoxification and neutralization of hazardous substances, and more particularly to a novel chemical composition incorporating a detoxifying combination of substances which are rapidly neutralizing toxic formaldehyde vapors, and detoxifying formaldehydes in aqueous and non-aqueous unused or spent solutions, and molecularly encapsulating methanol, methylene and oxymethylene glycol in inhibited formaldehyde solutions.

2. Brief Description of the Prior Art

Formaldehyde is produced as aqueous and non-aqueous solutions containing variable amounts of methanol. The aqueous solutions are complex equilibrium mixtures of methylene glycol, poly (oxymethylene glycols) and hemiformals of these compounds. The methanolic solutions of formaldehyde can be stored at relatively low temperatures without precipitation of polymer. Formaldehyde is a protoplasmic poison, it has been classified as an extremely toxic hazardous substance. Even the disposal of low concentrated formaldehyde solutions has become a problem because of the toxic effects and potential cancer risk associated with formaldehyde usage. Available formaldehyde neutralzng products are intended for use with 10% formalin (approximately 3.7% formaldehyde, w/v) only. If formaldehyde of higher concentration is to be neutralized, it must be diluted to 10% formalin before adding these neutralizers. Some of these products contain mineral acids such as phosphoric acid, other products work by a reversible reaction, and finally, some of these formaldehyde neutralizers have reaction mechanisms with toxic and/or probably toxic by-products. The proposed combination converts formaldehyde into feasibly recuperable, valuable crude pharmaceutical product. In addition,the neutralization time is 5 minutes, compared to about the 20 minutes for other products.

Therefore a long-standing need exists to provide a unique neutralizer which not only detoxifies the extremely toxic formaldehyde fumes more concentrated formaldehyde solutions, but encapsulates and modifies the chemical activity of the complex equilibrium mixtures, converts formaldehyde into a non-hazardous crude pharmaceutical compound, and allows a safe storage and disposal.

SUMMARY OF THE INVENTION

Accordingly, the above problems and difficulties are obviated by the present invention, which provides a chemical composition that detoxifies formaldehyde in gaseous state, and in aqueous and non-aqueous solutions. The said composition modifies the chemical activity of the methanol and equilibrium components (glycols) by molecular encapsulation, complexation and stabilization. Therefore, it is among the primary objects of the present invention to provide a novel, fast reacting neutralizer for toxic formaldehyde vapors.

Another object of present invention is to provide a fast reacting detoxifier for formaldehyde in aqueous/non-aqueous solutions of various concentrations.

Yet another object of the present invention is to provide a fast reacting neutralizer for incidental releases of aqueous and/or non-aqueous formaldehyde solutions of various concentrations.

Yet another object of the present invention to provide a highly feasible treatment of formaldehyde wastes, which yields a valuable crude pharmaceutical product.

Still another object of the present invention is to provide a cleaner environment in the embalming rooms, hospitals, dialysis centers, educational laboratories and clinical laboratories.

DESCRIPTION OF THE PREFERRED COMPOSITION

The composition/formulation of the present invention which is believed to be novel is set forth with particularity in the appended claims. The present invention, both as to its organization and manner of operation, together with further objects and advantages thereof, may best be understood with reference to the following description. A polyhydric alkanolamine, the tris (hydroxymethyl)aminomethane, obtained by the reduction of a nitroalcohol, is employed for rapid neutralization of formaldehyde vapors, and of formaldehyde in aqueous and non-aqueous solutions of various concentrations. It reacts with formaldehyde at room temperature to give bicyclic oxazolidines. The formation of the oxazolidines from this alkanolamine and formaldehyde occurs in a very short time because the reaction consumes two moles of formaldehyde per one mole of alkanolamine. A coumarin metabolite, the 4-hydroxycoumarin is used as a second formaldehyde neutralizer. 4-hydroxycoumarin reacts with formaldehyde in aqueous solution to give dicoumarol or 3,3'- methylene-bis-[4-hydroxycoumarin].

A cyclic non-reducing oligosaccharide obtained by enzymatic conversion of dextrin in the presence of toluene, built up from seven glucopyranose rings, the beta cyclodextrin, is used for molecular inclusion complexation for all the components of the embalming fluids. The conical molecular structure with central cavity of the beta cyclodextrin will form three-dimensional inclusion complexes with guest molecules, thereby it will modify the apparent physical and chemical properties of the guest molecules. The potential guest list for molecular inclusion includes aliphatics, aldehydes, alcohols, organic acids, fatty acids, aromatics, oxy-acids, amines and gases.

Urea is an inclusion compound with spaces in the shape of long tunnels. Ordinary crystalline urea is tetragonal, but when formaldehyde is present, urea crystallizes in a hexagonal lattice, containing formaldehyde in its channels. There is no binding between the host and the guest, except van der Waals forces, the addition complex by gradually releasing formaldehyde into the reaction with 4-hydroxycoumarin, facilitates the optimal efficiency of the reaction.

The particular formulation of the present invention is the following:

| For 100 mL aqueous solution: Components | Parts by weight |
|---|---|
| tris(hydroxymethyl)aminomethane | 20.0 g |
| 4-hydroxycoumarin | 3.0 g |
| heta cyclodextrin | 1.0 g |
| urea | 1.0 g |

What is claimed is:

1. A composition for use in rapid detoxification of toxic formaldehyde vapors from incidental releases of unused or spent aqueous and/or non-aqueous formaldehyde solutions of various concentrations, comprising tris(hydroxymethyl) aminomethane and 4-hydroxycoumarin.

* * * * *